(No Model.) 3 Sheets—Sheet 2.
T. H. BLAIR & F. H. KELLEY.
CAMERA SHUTTER.
No. 491,921. Patented Feb. 14, 1893.
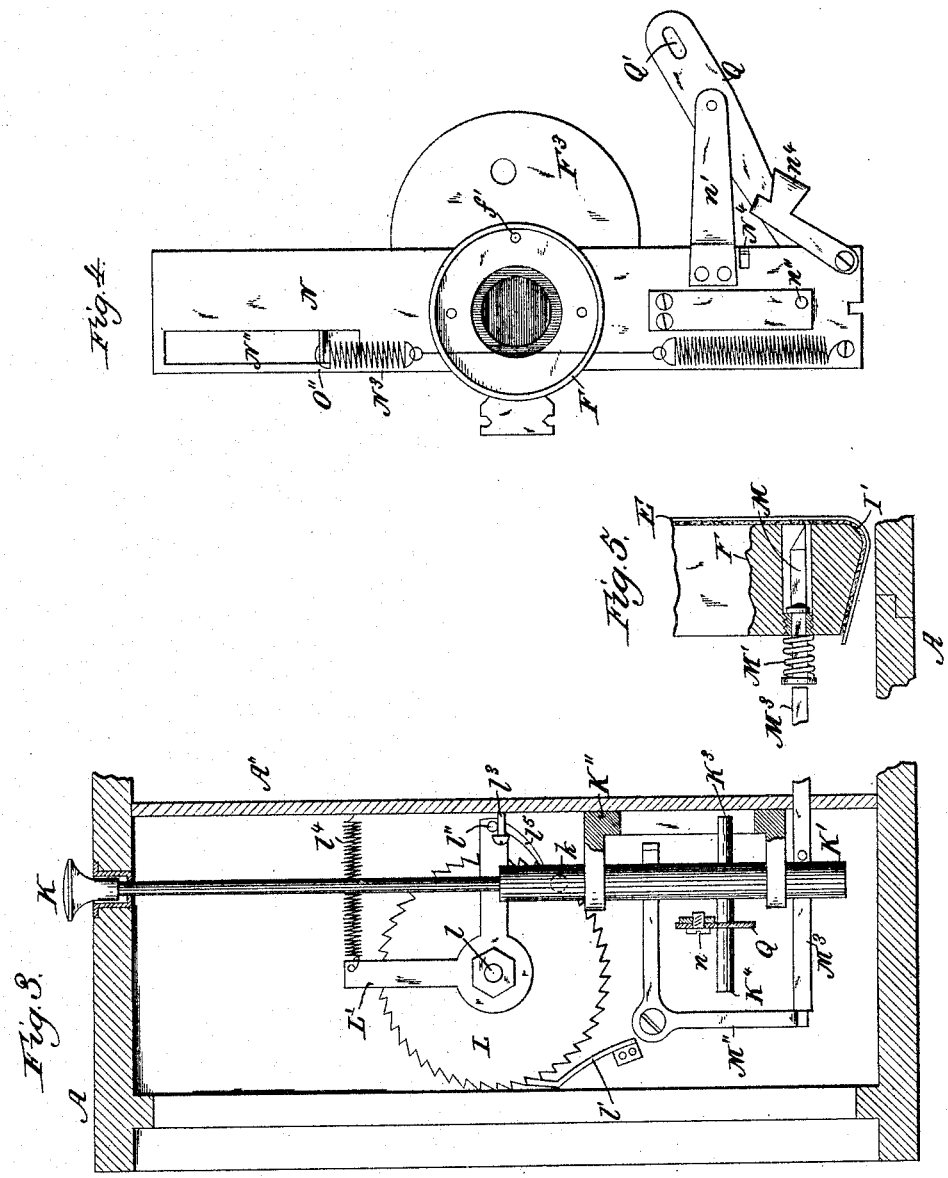
WITNESSES
Irving H. Fay.
Alice A. Perkins.
INVENTORS
Thomas H. Blair
and Fred H. Kelley, by
Alvan Andrew ATTY (No Model.) 3 Sheets—Sheet 3.
T. H. BLAIR & F. H. KELLEY.
CAMERA SHUTTER.
No. 491,921. Patented Feb. 14, 1893.
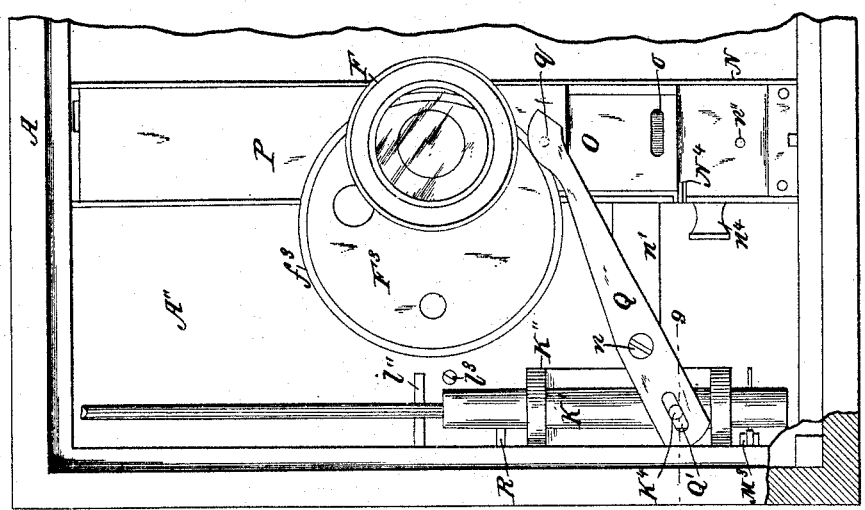
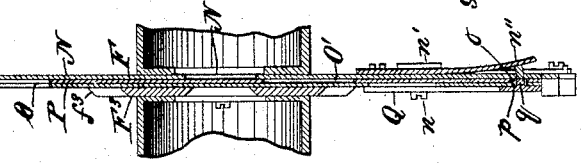
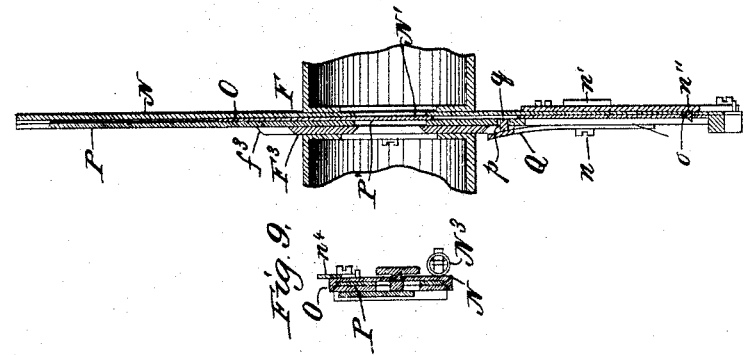
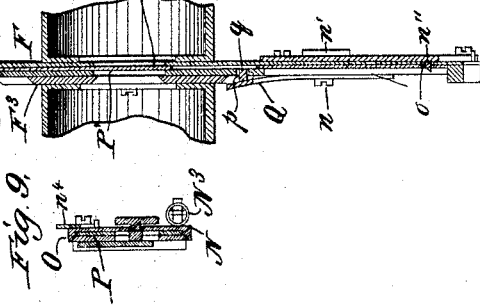
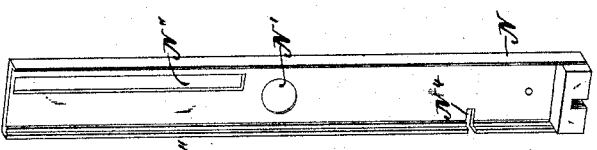
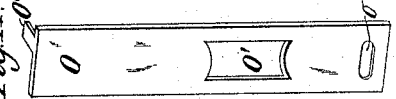
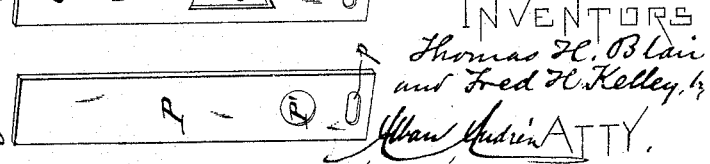

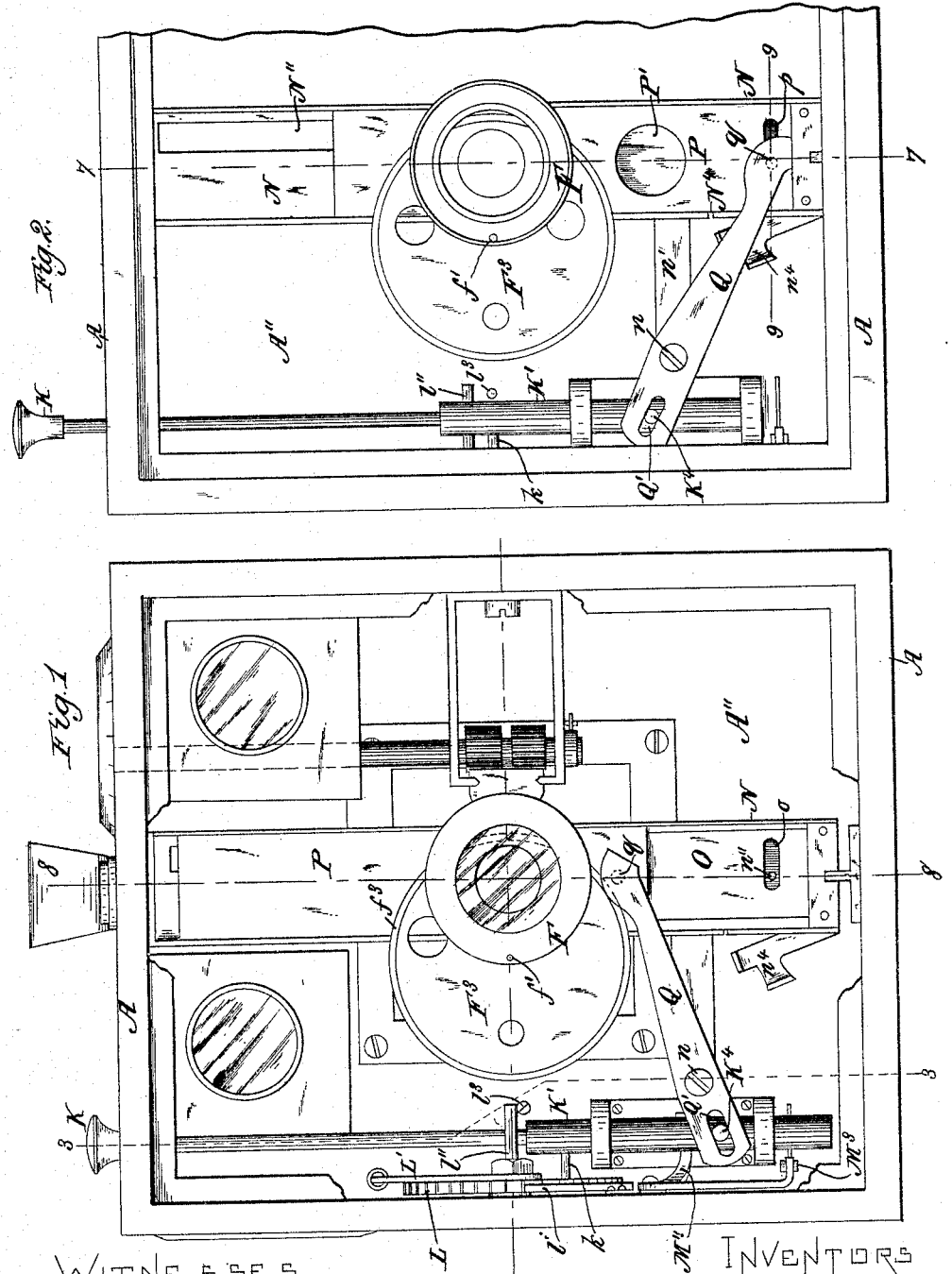

UNITED STATES PATENT OFFICE.

THOMAS H. BLAIR AND FRED H. KELLEY, OF BOSTON, MASSACHUSETTS, ASSIGNORS TO THE BLAIR CAMERA COMPANY, OF SAME PLACE.

CAMERA-SHUTTER.

SPECIFICATION forming part of Letters Patent No. 491,921, dated February 14, 1893.

Application filed June 18, 1892. Serial No. 437,147. (No model.)

*To all whom it may concern:*

Be it known that we, THOMAS H. BLAIR and FRED H. KELLEY, citizens of the United States, residing at Boston, in the county of Suffolk and State of Massachusetts, have invented new and useful Improvements in Shutter Mechanism for Cameras, of which the following is a specification.

This invention has for its object to provide a new and improved shutter mechanism for cameras to make time or instantaneous exposures, and it consists in the features of construction and combination or arrangement of devices hereinafter described and claimed, reference being made to the accompanying drawings, in which—

Figure 1, is an end elevation of a camera box omitting the front cover and illustrating my improved shutter mechanism with the parts in normal position. Fig. 2, is a similar view broken away and omitting some of the parts to illustrate the devices set for exposure. Fig. 3, is a vertical sectional view taken on the line 3—3 Fig. 1. Fig. 4, is a detail rear view of the shutter in the position represented by Fig. 2. Fig. 5, is a detail sectional view of a portion of the bed over which the film is moved, and showing a portion of the puncturing mechanism hereinafter explained. Fig. 6, is a view similar to Fig. 2, showing the devices set for time exposure. Fig. 7, is a vertical sectional view taken on the line 7—7 Fig. 2. Fig. 8, is a vertical sectional view taken on the line 8—8 Fig. 1. Fig. 9, is a detail horizontal sectional view taken on the line 9—9 Fig. 2. Fig. 10, is a detail perspective view of the shutter guide. Fig. 11, is a detail perspective view of the main shutter, and Fig. 12, is a similar view of the auxiliary shutter.

In order to enable those skilled in the art to make and use our invention we will now describe the same in detail, referring to the drawings wherein—

The letter A indicates a camera box of any construction suitable for the conditions required and provided interiorly with a diaphragm $A''$ which is situated in rear of the usual front cover containing a lens perforation. The front cover is not illustrated as it is not essential for the proper understanding of our invention. The diaphragm $A''$ is provided as usual with a lens perforation coincident with the lens tube F for exposing the film E which is caused to traverse the film bed I Fig. 5, in any suitable manner but preferably as described and shown in our application for Letters Patent filed July 25, 1891, Serial No. 400,734, to which reference may be had for those details of construction which we do not deem essential to herein specifically describe and illustrate in the drawings.

To the lens tube F is pivoted as at $f'$, Figs. 1 2 and 4, a perforated circular disk or diaphragm $F^3$ having at its periphery a beveled edge $f^3$, said disk or diaphragm passing through a slit in the lens tube and being adapted to turn so as to place any one of its orifices or perforations in line with the lens perforation as usual in lenses of this character. A shutter guide N extends through the lens tube and is provided with a perforation $N'$ to register with the lens perforation, and the main shutter O and auxiliary shutter P are adapted to move longitudinally in the shutter guide, said shutters being provided respectively with exposure orifices $O'$ and $P'$ Figs. 11 and 12.

The main shutter O has a lip $O''$ passing through a slot $N''$ in the guide N and when said shutter is released it is automatically returned to its normal position shown in Figs. 1 and 8, by the influence of a spring $N^3$, one end of which is secured to the guide N and the other to the lip $O''$ on the main shutter O, as shown in Fig. 4.

The auxiliary shutter P is positively operated in both directions by means of a spring metal lever Q pivoted at $n$ to a bracket $n'$ on the shutter guide N and having a slotted perforation $Q'$ adapted to receive a pin $K^4$ on the shutter operating rod or spindle $K'$ as shown. The lever Q is connected to the auxiliary shutter P by means of a pin $q$ on the underside of said lever fitting into a slotted perforation $p$ in the auxiliary shutter.

The main shutter O has a slotted perforation $o$ as shown which is adapted to receive a yielding spring pressed locking pin $n''$ on the guide N when the said shutter O after exposure is returned to its normal position as shown in Figs. 1 and 8. The slotted perforation $o$ also serves for receiving the projection $q$ on the spring metal lever Q while carrying both of the shutters O, P, to exposure.

The parts are normally in the position shown by Figs. 1 and 8 and by pulling out the knob K the lever Q is swung to the position shown in Fig. 2, and the auxiliary shutter P is carried to one of its extreme positions, so that its slot $p$ coincides with the slot $o$ in the main shutter O, whereupon the projection $q$ on the underside of the spring metal lever Q will be forced by the springy nature of the latter through the perforation $o$ in the shutter O and against the yielding locking projection $n''$, causing the latter to be disengaged from the main shutter O, at the same time causing both shutters O and P to be connected to the pin $q$ on the lever Q. If it is now desired to make an instantaneous exposure, the button K is pushed inward to the end of its stroke, thereby causing the lever Q to be swung to the position shown in Fig. 1 and the shutters P and O to be moved to the end of their stroke, where the perforation P' coincides with the lens perforation. When the end of the lever Q' comes in contact with the beveled edge $f^3$ of the diaphragm $F^3$, the end of said lever is moved laterally, sufficiently to cause the pin $q$ on the lever to be disengaged from the slot $o$ in the shutter O, which being thus released is carried back by its spring $N^3$ to its normal position shown in Figs. 1 and 8, and during such return motion of the shutter O, its perforation O' instantaneously passes by the lens perforation to expose the film and closes the lens opening immediately upon such exposure being made.

When it is desired to make a time exposure, the button K, after having been pulled out as described, is pushed partially inward until the lever Q, with the shutters O and P, are about in their midway position, when the end of a pivoted gate or stop $n^4$ is moved into a notch $N^4$ in the shutter guide. By pushing the button K inward to the end of its stroke, the shutters O and P will be moved simultaneously until the lens opening coincides with the opening P' in the shutter P, at which time the shutter O is released by the lever Q coming in contact with the inclined edge $f^3$ on the diaphragm $F^3$ as before explained, by which the shutter O is released and carried by its spring $N^3$ against the gate or stop $n^4$ as in Fig. 6, in which position the perforation O' coincides with the lens perforation, thus leaving the lens open and the film exposed. After the proper time exposure has been made, the lens opening is closed simply by pulling the knob K.

In practice we use a puncturing device actuated by the shutter operating mechanism for the purpose of puncturing or marking the edge of the film E previous to making an exposure, so as to enable the operator to cut the film on lines between the successive exposures. The puncturing or marking rod M Fig. 5, extends through the film bed I and is normally held from contact with the film by a spring M', and is advanced to puncture or mark the film by the action of a rod $M^3$, as hereinafter explained. The rod or spindle K' is provided with a pin $K^3$ which, as the knob K is pulled outward, comes in contact with one arm of a bell crank lever M'', the other end of which acts on one end of the rod $M^3$, the opposite end of which bears against the puncturing or marking rod M to force it in the direction to puncture or mark the film each time the knob K of the rod or spindle K' is pulled outward. The rod or spindle K also operates a registering mechanism for regising the number of exposures made and to accomplish this a dial register wheel L is arranged to be operated by a spring pawl $l^5$ mounted on a pin $l''$ which is carried by a bell crank lever L', swinging on the shaft or journal $l$ on which the dial register wheel L turns or rotates. The dial register wheel is held against retrograde movement by a spring stop pawl $l'$ and the rod or spindle K' is provided with a pin $k$ adapted to strike one arm of the bell crank lever when the knob K is pulled out, whereby the pawl $l^5$ is set to another notch in the periphery of the dial register wheel L. The bell crank lever L' is acted upon by spring $l^4$ which causes the bell crank lever to resume its normal position after being operated by the pin $k$ so that the pawl $l^5$ turns the dial register wheel one step, by which means the number of exposures is registered. The pin is normally held in contact with a stationary projection $l^3$ on the diaphragm A'' by the action of the spring $l^4$. By the means described the spindle K' serves to operate the film registering mechanism and also the film puncturing or marking devices in a very simple and efficient manner.

Having thus described our invention what we claim is:—

1. In a camera shutter mechanism, the combination with a shutter guide, of an auxiliary and a main shutter superimposed on each other and slidable in the shutter guide, a spring for moving the main shutter in one direction, a pivoted flexible lever having a lateral pin loosely connected with the auxiliary shutter and detachably engaging the main shutter, a lengthwise movable spindle connected with the flexible lever for swinging the same, and a device arranged in the path of the flexible lever and acting directly thereupon to automatically release its lateral pin from the main shutter so that the latter can move under the influence of its spring, substantially as described.

2. In a camera shutter mechanism, the combination with a shutter guide, of an auxiliary and a main shutter superimposed on each other and slidable in the shutter guide, a spring for moving the main shutter in one direction, a pivoted flexible lever having a lateral pin loosely connected with the auxiliary shutter and detachably engaging the main shutter, a diaphragm having a beveled edge located in the path of the flexible lever and acting directly thereupon to automatically release its lateral pin from the main shutter so that the latter can move under the influence of its spring, and a gate or stop pivoted to the shutter guide for limiting the sliding movement of the main shutter to effect time exposure, substantially as described.

In testimony whereof we have hereunto set our hands and affixed our seals in presence of two subscribing witnesses.

THOMAS H. BLAIR. [L. S.]
  FRED H. KELLEY. [L. S.]

Witnesses:
 HENRY W. BELKNAP,
 MAE E. KULL.